United States Patent
Holz

(10) Patent No.: US 12,347,145 B2
(45) Date of Patent: *Jul. 1, 2025

(54) DETERMINING THE RELATIVE LOCATIONS OF MULTIPLE MOTION-TRACKING DEVICES

(71) Applicant: Ultrahaptics IP Two Limited, Bristol (GB)

(72) Inventor: David S. Holz, San Francisco, CA (US)

(73) Assignee: Ultrahaptics IP Two Limited, Bristol (GB)

(*) Notice: Subject to any disclaimer, the term of this patent is extended or adjusted under 35 U.S.C. 154(b) by 0 days.

This patent is subject to a terminal disclaimer.

(21) Appl. No.: 18/662,932

(22) Filed: May 13, 2024

(65) Prior Publication Data
US 2024/0296588 A1 Sep. 5, 2024

Related U.S. Application Data

(63) Continuation of application No. 17/578,236, filed on Jan. 18, 2022, now Pat. No. 12,020,458, which is a
(Continued)

(51) Int. Cl.
*G06K 9/20* (2006.01)
*G06T 7/30* (2017.01)
(Continued)

(52) U.S. Cl.
CPC .............. *G06T 7/85* (2017.01); *G06T 7/30* (2017.01); *G06V 10/147* (2022.01); *G06V 40/28* (2022.01);
(Continued)

(58) Field of Classification Search
CPC .......... G06K 9/209; G06T 2207/10021; G06T 2207/30196; G06T 7/002; G06T 7/0024
See application file for complete search history.

(56) References Cited

U.S. PATENT DOCUMENTS

| 7,936,374 B2 | 5/2011 | Cutler |
| 9,348,419 B2 | 5/2016 | Julian et al. |

(Continued)

FOREIGN PATENT DOCUMENTS

| JP | 2002512069 A | 4/2002 |
| KR | 20090006825 A | 1/2009 |
| WO | 2014145279 | 9/2014 |

OTHER PUBLICATIONS

Hamer et al. "Tracking a Hand Manipulating an Object". 8 pages.
(Continued)

*Primary Examiner* — James T Boylan
(74) *Attorney, Agent, or Firm* — Haynes Beffel & Wolfeld LLP; Andrew L. Dunlap

(57) ABSTRACT

The technology disclosed relates to coordinating motion-capture of a hand by a network of motion-capture sensors having overlapping fields of view. In particular, it relates to designating a first sensor among three or more motion-capture sensors as having a master frame of reference, observing motion of a hand as it passes through overlapping fields of view of the respective motion-capture sensors, synchronizing capture of images of the hand within the overlapping fields of view by pairs of the motion-capture devices, and using the pairs of the hand images captured by the synchronized motion-capture devices to automatically calibrate the motion-capture sensors to the master frame of reference frame.

18 Claims, 9 Drawing Sheets

Related U.S. Application Data continuation of application No. 16/525,476, filed on Jul. 29, 2019, now Pat. No. 11,227,172, which is a continuation of application No. 16/022,638, filed on Jun. 28, 2018, now Pat. No. 10,366,297, which is a continuation of application No. 14/214,677, filed on Mar. 15, 2014, now Pat. No. 10,037,474.

(60) Provisional application No. 61/792,551, filed on Mar. 15, 2013.

(51) Int. Cl.
*G06T 7/80* (2017.01)
*G06V 10/147* (2022.01)
*G06V 40/20* (2022.01)

(52) U.S. Cl.
CPC .............. *G06T 2207/10021* (2013.01); *G06T 2207/30196* (2013.01)

(56) References Cited

U.S. PATENT DOCUMENTS

| | | | |
|---|---|---|---|
| 9,383,895 | B1 | 7/2016 | Vinayak et al. |
| 9,922,447 | B2 | 3/2018 | Kosoy et al. |
| 10,037,474 | B2 | 7/2018 | Holz |
| 10,366,297 | B2 | 7/2019 | Holz |
| 11,227,172 | B2 | 1/2022 | Holz |
| 2002/0118969 | A1 | 8/2002 | Kanade et al. |
| 2003/0093805 | A1 | 5/2003 | Gin |
| 2005/0075575 | A1 | 4/2005 | Vo-Dinh |
| 2005/0279172 | A1 | 12/2005 | Schreier et al. |
| 2006/0024041 | A1 | 2/2006 | Lou et al. |
| 2006/0056056 | A1 | 3/2006 | Ahiska et al. |
| 2007/0285282 | A1 | 12/2007 | Nakayama et al. |
| 2008/0055396 | A1 | 3/2008 | Shiue et al. |
| 2008/0101652 | A1 | 5/2008 | Zhao et al. |
| 2008/0198039 | A1 | 8/2008 | Philiben |
| 2009/0251601 | A1 | 10/2009 | Ihlefeld et al. |
| 2010/0027845 | A1 | 2/2010 | Kim et al. |
| 2011/0025853 | A1 | 2/2011 | Richardson |
| 2011/0074931 | A1 | 3/2011 | Bilbrey et al. |
| 2011/0181729 | A1* | 7/2011 | Lee .................. H04N 7/185 348/E7.085 |
| 2011/0310255 | A1 | 12/2011 | Medeiros |
| 2012/0075428 | A1 | 3/2012 | Seki |
| 2012/0257065 | A1 | 10/2012 | Velarde et al. |
| 2013/0010079 | A1 | 1/2013 | Zhang et al. |
| 2013/0016097 | A1 | 1/2013 | Coene et al. |
| 2013/0120224 | A1 | 5/2013 | Cajigas et al. |
| 2013/0188017 | A1 | 7/2013 | Ma |
| 2013/0235163 | A1 | 9/2013 | Joo |
| 2014/0021356 | A1 | 1/2014 | Zwaans et al. |
| 2014/0043436 | A1 | 2/2014 | Bell et al. |
| 2014/0104394 | A1 | 4/2014 | Yanai et al. |
| 2014/0267666 | A1 | 9/2014 | Holz |
| 2014/0277742 | A1 | 9/2014 | Wells et al. |
| 2015/0015482 | A1 | 1/2015 | Njolstad et al. |

OTHER PUBLICATIONS

PCT/US2015/012441, International Search Report and Written Opinion dated Apr. 9, 2015; 10 pages.

Internet Wayback archive for providing date of Ballan et al. (Motion Capture of Hands in Action using Discriminative SalientPoints, 3 pages.

Oikonomidis et al. "Full DOF Tracking of a Hand Interacting with an Object by Modeling Occlusions and Physical Constraints", Institute of Computer Science, IEEE, 2011, 8 pages.

Romero et al. "Hands in Action: Real-time 3D Reconstruction of Hands Interaction with Objects", 6 pages.

Sridhar et al. "Real-Time Joint Tracking of a Hand Manipulating an Object from RGB-D Input" (Date After Applicants) (Note: Plural relevant references located in the references section), 17 pages.

Mann, S., et al., "Video Orbits: Characterizing the Coordinate Transformation Between Two Images Using the Projective Group," MIT Media Lab, Cambridge, Massachusetts, Copyright Feb. 1995, 14 pages.

PCT/US2014/030013—International Search Report dated Aug. 5, 2014, 10 pages.

PCT/US2014/030013—International Preliminary Report on Patentability dated Sep. 15, 2015.

PCT/US2015/012441—International Preliminary Report on Patentability dated Jul. 26, 2016.

Ballan et al., Motion Capture of Hands in Action using Discriminative Salient Points, 14 pages.

Wang et al. "Video-based Hand Manipulation Capture Through Composite Motion Control", Jul. 2013 (Date After Applicants), 14 pages.

U.S. Appl. No. 14/163,816—Notice of Allowance dated Jan. 29, 2016, 10 pages.

* cited by examiner

| REFERENCE | TARGET | $T_X$ | $T_Y$ | $T_Z$ | $\alpha$ |
|---|---|---|---|---|---|
| 305p | 305p | 0 | 0 | 0 | 0 |
| 305p | 305m | 1 | 5 | 3 | 15° |
| 305p | 305n | 3 | 7 | 5 | 30° |
| 305p | 305o | 5 | 9 | 7 | 45° |

| REFERENCE | TARGET | $T_X$ | $T_Y$ | $T_Z$ | $\alpha$ |
|---|---|---|---|---|---|
| 305p | 305p | -5 | -9 | -7 | 350° |

| REFERENCE | TARGET | $T_X$ | $T_Y$ | $T_Z$ | $\alpha$ |
|---|---|---|---|---|---|
| 305m | 305n | 2 | 2 | 2 | 15° |

| REFERENCE | TARGET | $T_X$ | $T_Y$ | $T_Z$ | $\alpha$ |
|---|---|---|---|---|---|
| 305p | 305m | 1 | 5 | 3 | 15° |

| REFERENCE | TARGET | $T_X$ | $T_Y$ | $T_Z$ | $\alpha$ |
|---|---|---|---|---|---|
| 305n | 305o | 2 | 2 | 2 | 15° |

*FIG. 4B*

DETERMINING THE RELATIVE LOCATIONS OF MULTIPLE MOTION-TRACKING DEVICES

PRIORITY APPLICATIONS

This application is a continuation of U.S. application Ser. No. 17/578,236 titled "Determining the Relative Locations of Multiple Motion-Tracking Devices," filed 18 Jan. 2022, which is a continuation of U.S. application Ser. No. 16/525,476, titled "Determining the Relative Locations of Multiple Motion-Tracking Devices," filed 29 Jul. 2019, now U.S. Pat. No. 11,227,172 issued 18 Jan. 2022, which is a continuation of U.S. application Ser. No. 16/022,638, titled "Determining the Relative Locations of Multiple Motion-Tracking Devices," filed 28 Jun. 2018, now U.S. Pat. No. 10,366,297 issued 30 Jul. 2019, which is a continuation of U.S. application Ser. No. 14/214,677, titled "Determining the Relative Locations of Multiple Motion-Tracking Devices," filed 15 Mar. 2014, now U.S. Pat. No. 10,037,474 issued 31 Jul. 2018, which claims the benefit of U.S. Provisional Patent Application No. 61/792,551, titled, "Determining the Relative Locations of Multiple Motion-Tracking Devices Through Image Analysis," filed 15 Mar. 2013; the disclosures of each are hereby incorporated by reference herein in their entireties.

FIELD OF THE TECHNOLOGY DISCLOSED

The technology disclosed relates, in general, to motion tracking and, in particular, to determining geometric relationships among multiple motion-tracking devices.

BACKGROUND

Motion capture has numerous applications. For example, in filmmaking, digital models generated using motion capture can be used as the basis for the motion of computer generated characters or objects. In sports, motion capture can be used by coaches to study an athlete's movements and guide the athlete toward improved body mechanics. In video games or virtual reality applications, motion capture allows a person to interact with a virtual environment in a natural way, e.g., by waving to a character, pointing at an object, or performing an action such as swinging a golf club or baseball bat.

The term "motion capture" refers generally to processes that capture movement of a subject in three-dimensional (3D) space and translate that movement into, for example, a digital model or other representation. Motion capture is typically used with complex subjects that have multiple separately articulating members whose spatial relationships change as the subject moves. For instance, if the subject is a walking person, not only does the whole body move across space, but the positions of arms and legs relative to the person's core or trunk are constantly shifting. Motion capture systems can model this articulation.

Depending on the space being monitored, more than one motion sensor can be deployed. For example, the monitored space can have obstructions that prevent a single motion sensor from "seeing" all relevant activity or it can be desired to monitor a moving object from multiple vantage points. In order to combine images of common or overlapping subject matter from multiple sensors, it is necessary for the sensors to be calibrated to a common coordinate frame of reference. Similar requirements occur in medical imaging applications where more than one imaging modality (e.g., MRI and CT apparatus) is employed to scan the same anatomic region to produce enhanced images in register. In such applications, the reference frames of the imaging devices are aligned with each other and with the geometry of the treatment room using sophisticated laser sighting equipment. Such measures are not practical for many if not most applications involving motion sensing, however—particularly for consumer or gaming applications; in such cases users should be free to move the sensors at will and without inconvenience.

SUMMARY

The technology disclosed relates to coordinating motion-capture of a hand by a network of motion-capture sensors having overlapping fields of view. In particular, it relates to designating a first sensor among three or more motion-capture sensors as having a master frame of reference, observing motion of a hand as it passes through overlapping fields of view of the respective motion-capture sensors, synchronizing capture of images of the hand within the overlapping fields of view by pairs of the motion-capture devices, and using the pairs of the hand images captured by the synchronized motion-capture devices to automatically calibrate the motion-capture sensors to the master frame of reference frame.

The technology disclosed further facilitates self-calibration of multiple motion sensors to a common coordinate reference frame. In various implementations, the motion sensors determine their locations in relation to each other by analyzing images of common subject matter captured by each device and reconstructing the rigid transformations that relate the different images. This capability allows a user to independently place each motion capture device for the most advantageous arrangement to capture all critical perspectives of the object(s) of interest and subsequent movement. Importantly, the geometry of the room or surrounding environment is irrelevant to the analysis since it does not affect the ability to characterize and track objects moving within the space. Rather, the approach of the technology disclosed is to establish the geometry among the sensors and use this geometry to permit, for example, the sensor to operate in tandem to track a single object.

Reference throughout this specification to "one example," "an example," "one implementation," or "an implementation" means that a particular feature, structure, or characteristic described in connection with the example is included in at least one example of the present technology. Thus, the occurrences of the phrases "in one example," "in an example," "one implementation," or "an implementation" in various places throughout this specification are not necessarily all referring to the same example. Furthermore, the particular features, structures, routines, steps, or characteristics can be combined in any suitable manner in one or more examples of the technology. The headings provided herein are for convenience only and are not intended to limit or interpret the scope or meaning of the claimed technology.

Advantageously, these and other aspects enable machines, computers and/or other types of intelligent devices, and/or other types of automata to obtain information about objects, events, actions, and/or users employing gestures, signals, and/or other motions conveying meaning and/or combinations thereof. These and other advantages and features of the implementations herein described, will become more apparent through reference to the following description, the accompanying drawings, and the claims. Furthermore, it is to be understood that the features of the various implementations described herein are not mutually exclusive and can exist in various combinations and permutations.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which:

FIGS. 4A and 4B are tables of geometric transformation parameters between motion sensor devices in accordance with an implementation of the technology disclosed.

DESCRIPTION

As used herein, a given signal, event or value is "responsive to" a predecessor signal, event or value of the predecessor signal, event or value influenced by the given signal, event or value. If there is an intervening processing element, action or time period, the given signal, event or value can still be "responsive to" the predecessor signal, event or value. If the intervening processing element or action combines more than one signal, event or value, the signal output of the processing element or action is considered "dependent on" each of the signal, event or value inputs. If the given signal, event or value is the same as the predecessor signal, event or value, this is merely a degenerate case in which the given signal, event or value is still considered to be "dependent on" the predecessor signal, event or value. "Dependency" of a given signal, event or value upon another signal, event or value is defined similarly.

As used herein, the "identification" of an item of information does not necessarily require the direct specification of that item of information. Information can be "identified" in a field by simply referring to the actual information through one or more layers of indirection, or by identifying one or more items of different information which are together sufficient to determine the actual item of information. In addition, the term "specify" is used herein to mean the same as "identify."

Embodiments of the technology disclosed provide sophisticated motion-capture systems housed in packages that allow them to be screwed or otherwise installed into conventional lighting fixtures, but which can capture and characterize movement at a detailed enough level to permit discrimination between, for example, a human and a pet, as well as between harmless and malicious activity (such as shoplifting). In some embodiments, the motion capture ("mocap") output of two or more sensors deployed around a spatial volume of interest may be combined into a fully three-dimensional (3D) representation of moving objects within the space, allowing a user (or an automated analysis system) to, for example, select an angle of view and follow a moving object from that vantage as the object moves through the monitored space, or to vary the angle of view in real time.

Pooling images acquired by multiple motion-sensing devices from different perspectives into a common space, or coordinate system, provides combined images containing more information than could be generated using the perspective of just one stationary sensor. This additional information can be used to generate a model that can be viewed over a full 360 degrees, or the images of the plurality of motion sensors can be "stitched" together to track the motion of an object as it moves from the field of view of one sensor to the next.

Figure 1A:
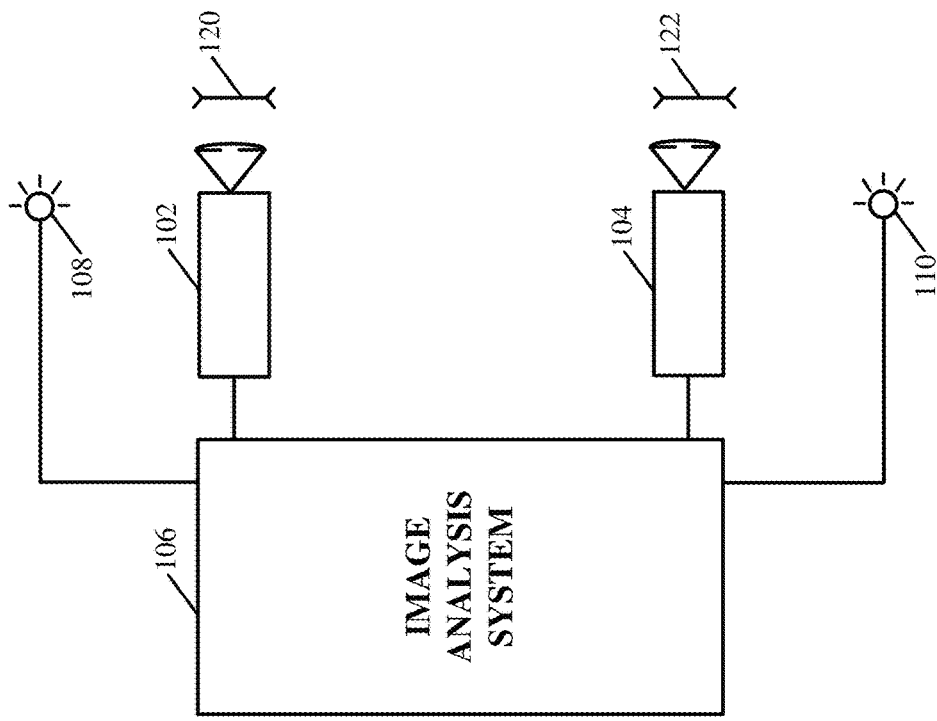
FIG. 1A illustrates a system for capturing image data according to an implementation of the technology disclosed.

Refer first to FIG. 1A, which illustrates an exemplary motion sensor 100 including any number of cameras 102, 104 coupled to an image-analysis system 106. Cameras 102, 104 can be any type of camera, including cameras sensitive across the visible spectrum or, more typically, with enhanced sensitivity to a confined wavelength band (e.g., the infrared (IR) or ultraviolet bands); more generally, the term "camera" herein refers to any device (or combination of devices) capable of capturing an image of an object and representing that image in the form of digital data. While illustrated using an example of a two camera implementation, other implementations are readily achievable using different numbers of cameras or non-camera light sensitive image sensors or combinations thereof. For example, line sensors or line cameras rather than conventional devices that capture a two-dimensional (2D) image can be employed. The term "light" is used generally to connote any electromagnetic radiation, which can or may not be within the visible spectrum, and can be broadband (e.g., white light) or narrowband (e.g., a single wavelength or narrow band of wavelengths).

The illustrated device 10 is configured with the form factor of an incandescent light bulb, including a contoured housing 20, also referred to as body portion 20, and a conventional base 25. The base 25 mates with an Edison screw socket, i.e., contains standard threads 22 and a bottom electrical contact 24 in the manner of a conventional light bulb. Threads 22 and contact 24 act as electrical contacts for device 10. Also contained within the housing 20 is circuitry as described below and one or more optical ports 30 through which a camera may record images. The ports may be simple apertures, transparent windows or lenses. In some examples, base 25 can include prongs mateable with a halogen lamp socket. In other examples, base 25 is formed as two opposed bases separated by body portion 20 and configured to be received within a fluorescent tube receptacle. In some implementations, FIG. 1A is an illustration the basic components of representative mocap circuitry 100 integrated within the housing 20 of device 10.

Cameras 102, 104 are preferably capable of capturing video images (i.e., successive image frames at a constant rate of at least 15 frames per second); although no particular frame rate is required. The capabilities of cameras 102, 104 are not critical to the technology disclosed, and the cameras can vary as to frame rate, image resolution (e.g., pixels per image), color or intensity resolution (e.g., number of bits of intensity data per pixel), focal length of lenses, depth of field, etc. In general, for a particular application, any cameras capable of focusing on objects within a spatial volume of interest can be used. For instance, to capture motion of the hand of an otherwise stationary person, the volume of interest might be defined as a cube approximately one meter on a side.

In some implementations, the illustrated system 100 includes one or more sources 108, 110, which can be disposed to either side of cameras 102, 104, and controlled by image-analysis system 106. In one implementation, the sources 108, 110 are light sources. For example, the light sources can be infrared light sources of generally conventional design, e.g., infrared light emitting diodes (LEDs), and cameras 102, 104 can be sensitive to infrared light. Use of infrared light can allow the motion sensor 100 to operate under a broad range of lighting conditions and can avoid various inconveniences or distractions that can be associated with directing visible light into the region where the object of interest is moving. In one implementation, filters 120, 122 are placed in front of cameras 102, 104 to filter out visible light so that only infrared light is registered in the images captured by cameras 102, 104. In another implementation, the sources 108, 110 are sonic sources providing sonic energy appropriate to one or more sonic sensors (not shown in FIG. 1A for clarity sake) used in conjunction with, or instead of, cameras 102, 104. The sonic sources transmit sound waves to the object; the object either blocks (or "sonic shadowing") or alters the sound waves (or "sonic deflections") that impinge upon it. Such sonic shadows and/or deflections can also be used to detect the object's motion. In some implementations, the sound waves are, for example, ultrasound, that is not audible to humans (e.g., ultrasound).

It should be stressed that the arrangement shown in FIG. 1A is representative and not limiting. For example, lasers or other light sources can be used instead of LEDs. In implementations that include laser(s), additional optics (e.g., a lens or diffuser) can be employed to widen the laser beam (and make its field of view similar to that of the cameras). Useful arrangements can also include short-and wide-angle illuminators for different ranges. Light sources are typically diffuse rather than specular point sources; for example, packaged LEDs with light-spreading encapsulation are suitable. Moreover, image-analysis system 106 may or may not be fully integrated within the motion sensor 100. In some implementations, for example, onboard hardware merely acquires and preprocesses image information and sends it, via a wired or wireless link, to a higher-capacity computer (e.g., a gaming console, or a tablet or laptop on which the display device is located) that performs the computationally intensive analysis operations. In still other implementations, the computational load is shared between onboard and external hardware resources.

In operation, light sources 108, 110 are arranged to illuminate a region of interest 112 in which an object of interest 114 (in this example, a hand) can be present; cameras 102, 104 are oriented toward the region 112 to capture video images of the object 114. In some implementations, the operation of light sources 108, 110 and cameras 102, 104 is controlled by the image-analysis system 106, which can be, e.g., a computer system. Based on the captured images, image-analysis system 106 determines the position and/or motion of object 114, alone or in conjunction with position and/or motion of other objects (e.g., hand holding the gun), not shown in FIG. 1A for clarity sake, from which control (e.g., gestures indicating commands) or other information can be developed. It also determines the position of motion sensor 100 in relation to other motion sensors by analyzing images the object 114 captured by each device and reconstructing the geometric transformations that relate the different images.

Figure 1B:
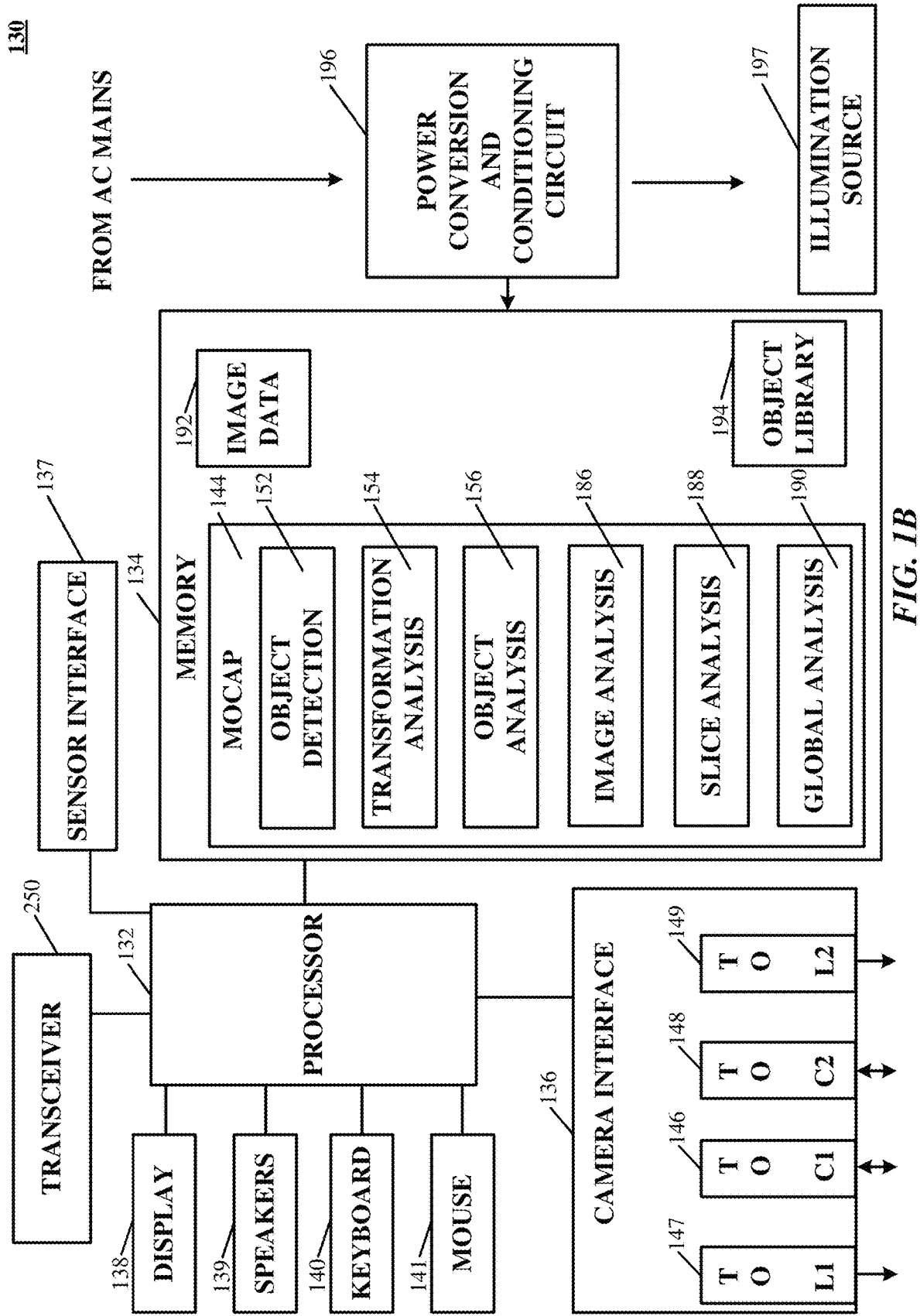
FIG. 1B is a simplified block diagram of a gesture-recognition system implementing an image analysis apparatus according to an implementation of the technology disclosed.

FIG. 1B is a simplified block diagram of a computer system 130 implementing image-analysis system 106 (also referred to as an image analyzer) according to an implementation of the technology disclosed. Image-analysis system 106 can include or consist of any device or device component that is capable of capturing and processing image data. As noted, the image-analysis system 106 can be fully implemented in each motion sensor or, to a desired design extent, in an external computer-e.g., a central computer system 130 that supports a plurality of sensors 100. In some implementations, computer system 130 includes a processor 132, a memory 134, a camera interface 136, a sensor interface 137, a display 138, speakers 139, a keyboard 140, and a mouse 141. Memory 134 can store instructions to be executed by processor 132 as well as input and/or output data associated with execution of the instructions. In particular, memory 134 contains instructions, conceptually illustrated as a group of modules described in greater detail below, that control the operation of processor 132 and its interaction with the other hardware components. An operating system directs the execution of low-level, basic system functions such as memory allocation, file management and operation of mass storage devices. The operating system can be or include a variety of operating systems such as Microsoft WINDOWS operating system, the Unix operating system, the Linux operating system, the Xenix operating system, the IBM AIX operating system, the Hewlett Packard UX operating system, the Novell NETWARE operating system, the Sun Microsystems SOLARIS operating system, the OS/2 operating system, the BeOS operating system, the MAC OS operating system, the APACHE operating system, an OPENACTION or OPENACTION operating system, iOS, Android or other mobile operating systems, or another operating system platform.

Image analysis module 186 can analyze images, e.g., images captured via camera interface 136, to detect edges or other features of an object. Slice analysis module 188 can analyze image data from a slice of an image as described below, to generate an approximate cross-section of the object in a particular plane. Global analysis module 190 can correlate cross-sections across different slices and refine the analysis. Memory 134 can also include other information used by mocap program 144; for example, memory 134 can store image data 192 and an object library 194 that can include canonical models of various objects of interest. An object being modeled can, in some embodiments, be identified by matching its shape to a model in object library 194.

The computing environment can also include other removable/non-removable, volatile/nonvolatile computer storage media. For example, a hard disk drive can read or write to non-removable, nonvolatile magnetic media. A magnetic disk drive can read from or write to a removable, nonvolatile magnetic disk, and an optical disk drive can read from or write to a removable, nonvolatile optical disk such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

Processor 132 can be a general-purpose microprocessor, but depending on implementation can alternatively be a microcontroller, peripheral integrated circuit element, a CSIC (customer-specific integrated circuit), an ASIC (application-specific integrated circuit), a logic circuit, a digital signal processor, a programmable logic device such as an FPGA (field-programmable gate array), a PLD (programmable logic device), a PLA (programmable logic array), an RFID processor, smart chip, or any other device or arrangement of devices that is capable of implementing the steps of the processes of the technology disclosed.

Camera interface 136 can include hardware and/or software that enables communication between computer system 130 and cameras such as cameras 102, 104 shown in FIG. 1A, as well as associated light sources such as light sources 108, 110 of FIG. 1A. Thus, for example, camera interface 136 can include one or more data ports 146, 148 to which cameras can be connected, as well as hardware and/or software signal processors to modify data signals received from the cameras (e.g., to reduce noise or reformat data) prior to providing the signals as inputs to a conventional motion-capture ("mocap") program 144 executing on processor 132. In some implementations, camera interface 136 can also transmit signals to the cameras, e.g., to activate or deactivate the cameras, to control camera settings (frame rate, image quality, sensitivity, etc.), or the like. Such signals can be transmitted, e.g., in response to control signals from processor 132, which can in turn be generated in response to user input or other detected events.

Camera interface 136 can also include controllers 147, 149, to which light sources (e.g., light sources 108, 110) can be connected. In some implementations, controllers 147, 149 supply operating current to the light sources, e.g., in response to instructions from processor 132 executing mocap program 144. In other implementations, the light sources can draw operating current from an external power supply (not shown), and controllers 147, 149 can generate control signals for the light sources, e.g., instructing the light sources to be turned on or off or changing the brightness. In some implementations, a single controller can be used to control multiple light sources.

Sensor interface 137 enables communication between computer system 130 and other motion sensor devices 100. In particular, sensor interface 137—which can be implemented in hardware and/or software-can include a conventional wired or wireless network interface for receiving images acquired by other motion sensors connected to the network and/or within a communication range, and also for sending to other motion sensors 100 images captured by cameras 102, 122; alternatively, the sensor interfaces 137 of all motion sensor devices can communicate with a central "hub" controller within range. As will be described in further detail below, the computer system 130 of system 100 can be designated, through communication with the other devices and/or central controller, as a "master" device to receive and analyze images from other devices to construct the 3D position and/or motion of the object 114 (e.g., a user's hand) tracked by at least some of the intercommunicating motion sensors. In another implementation, system 100 can function only as a motion capture device, transmitting images to another similar device that has been designated as the master, or all devices can transmit images to a central controller for motion-capture analysis. In yet another implementation, the system transmits the motion-capture analysis results along with, or instead of, the images captured to other devices and/or central controller within range.

Instructions defining mocap program 144 are stored in memory 134, and these instructions, when executed, perform motion-capture analysis on images supplied from cameras connected to camera interface 136 and-if the sensor 100 has been designated the "master" sensor in the sensor network-images supplied from other motion sensors connected through sensor interface 137. In one implementation, mocap program 144 includes various modules, such as an object detection module 152, a transformation analysis module 154, and an object analysis module 156. Object detection module 152 can analyze images (e.g., images captured via camera interface 136) to detect edges of an object therein and/or other information about the object's location. Transformation analysis module 154 generates translation and rotation parameters that describe the geometric shifts relating two images of the object simultaneously captured by different motion sensors. Object analysis module 156 analyzes the object information provided by object detection module 152 and transformation analysis module 154 to determine the 3D position and/or motion of the object in a single, common coordinate reference frame.

Examples of operations that can be implemented in code modules of mocap program 144 are described below. Memory 134 can also include other information and/or code modules used by mocap program 144. Display 138, speakers 139, keyboard 140, and mouse 141 can be used to facilitate user interaction with computer system 130. These components can be of generally conventional design or modified as desired to provide any type of user interaction. In some implementations, the results of motion capture using camera interface 136 and mocap program 144 can be interpreted as user input. For example, a user can perform hand gestures that are analyzed using mocap program 144, and the results of this analysis can be interpreted as an instruction to some other program executing on processor 132 (e.g., a web browser, word processor, or other application). Thus, by way of illustration, a user might use motions to control a game being displayed on display 138, use gestures to interact with objects in the game, and so on.

It will be appreciated that computer system 130 is illustrative and that variations and modifications are possible. Computer systems can be implemented in a variety of form factors, including server systems, desktop systems, laptop systems, tablets, smart phones or personal digital assistants, wearable devices, e.g., goggles, head mounted displays (HMDs), wrist computers, and so on. A particular implementation can include other functionality not described herein, e.g., media playing and/or recording capability, etc. Further, an image analyzer can be implemented using only a subset of computer system components (e.g., as a processor executing program code, an ASIC, or a fixed function digital signal processor, with suitable I/O interfaces to receive image data and output analysis results).

While computer system 130 is described herein with reference to particular blocks, it is to be understood that the blocks are defined for convenience of description and are not intended to require a particular physical arrangement of component parts. Further, the blocks need not correspond to physically distinct components. To the extent that physically distinct components are used, connections between components (e.g., for data communication) can be wired and/or wireless as desired.

Instructions defining mocap program 144 are stored in memory 134, and these instructions, when executed, perform motion-capture analysis on images supplied from cameras connected to camera interface 136. In one implementation, mocap program 144 includes various modules, such as an object detection module 152, an transformation analysis module 154, an object-analysis module 156, and an image analysis module 186; again, these modules can be conventional and well-characterized in the art. Memory 134 can also include keyboard 140, mouse 141 and any other input devices, as well as other information and/or code modules used by mocap program 144.

Cameras 102, 104 may be operated to collect a sequence of images of a monitored space. The images are time correlated such that an image from camera 102 can be paired with an image from camera 104 that was captured at the same time (within a few milliseconds). These images are then analyzed, e.g., using mocap program 144, to determine the position and shape of one or more objects within the monitored space. In some embodiments, the analysis considers a stack of 2D cross-sections through the 3D spatial field of view of the cameras. These cross-sections are referred to herein as "slices." In particular, an outline of an object's shape, or silhouette, as seen from a camera's vantage point can be used to define tangent lines to the object from that vantage point in various planes, i.e., slices. Using as few as two different vantage points, four (or more) tangent lines from the vantage points to the object can be obtained in a given slice. From these four (or more) tangent lines, it is possible to determine the position of the object in the slice and to approximate its cross-section in the slice, e.g., using one or more ellipses or other simple closed curves. As another example, locations of points on an object's surface in a particular slice can be determined directly (e.g., using a time-of-flight camera), and the position and shape of a cross-section of the object in the slice can be approximated by fitting an ellipse or other simple closed curve to the points. Positions and cross-sections determined for different slices can be correlated to construct a 3D model of the object, including its position and shape. A succession of images can be analyzed using the same technique to model motion of the object. The motion of a complex object that has multiple separately articulating members (e.g., a human hand) can also be modeled. In some embodiments, the silhouettes of an object are extracted from one or more images of the object that reveal information about the object as seen from different vantage points. While silhouettes can be obtained using a number of different techniques, in some embodiments, the silhouettes are obtained by using cameras to capture images of the object and analyzing the images to detect object edges. Further details of such modeling techniques are set forth in U.S. Ser. No. 13/742,953 (filed on Jan. 16, 2013), Ser. No. 13/414,485 (filed on Mar. 7, 2012), 61/724,091 (filed on Nov. 8, 2012) and 61/587,554 (filed on Jan. 17, 2012). The foregoing applications are incorporated herein by reference in their entireties.

In various embodiments, the device 10 also functions as a lighting device, supplying the light that a conventional illumination source (installed in the socket mating with the base 25) would provide. To this end, the device 10 includes an illumination source 197 that may be, for example, one or more light-emitting diodes (LEDs) or other conventional source. LED-based replacements for incandescent bulbs are widely available, and often utilize blue-emitting LEDs in combination with a housing coated with a yellow phosphor to produce white output light. The device 10 may be configured in this fashion, with a suitable phosphor coated on or inside a portion of housing 20 (e.g., above the ports 30) and one or more LEDs located inside the housing 20. Conventional power conversion and conditioning circuitry 196 receives power from the AC mains and outputs power suitable for driving both the illumination source 197 and computational circuitry 138. It should be stressed that input power may, depending on the intended use, come from sources other than the AC mains. For example, embodiments of the device 10 can be mated with sockets for low-voltage halogen or other lamps.

Figure 2A:
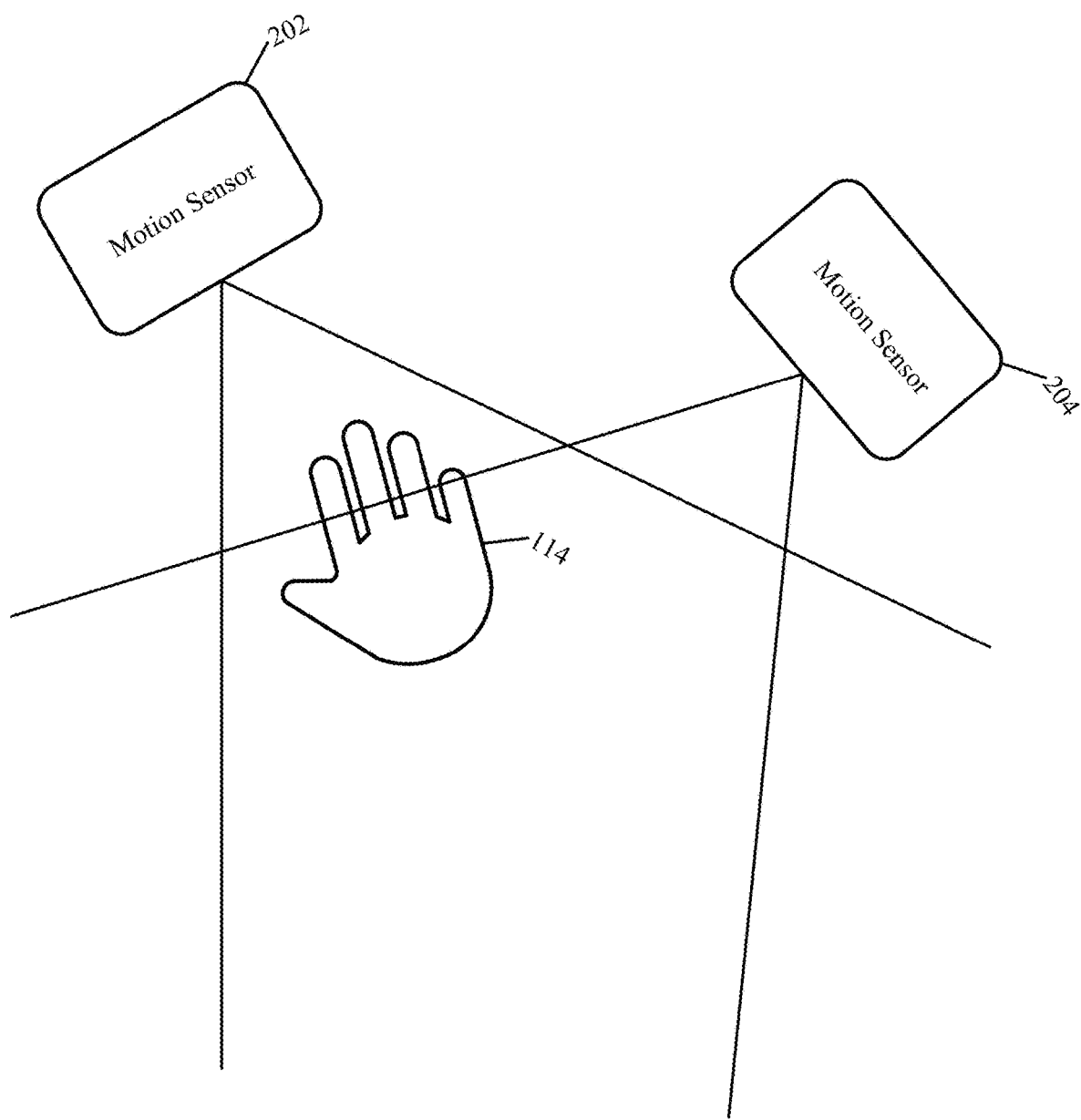
FIG. 2A illustrates the field of view of two motion sensor devices in accordance with an implementation of the technology disclosed.
Figure 2B:
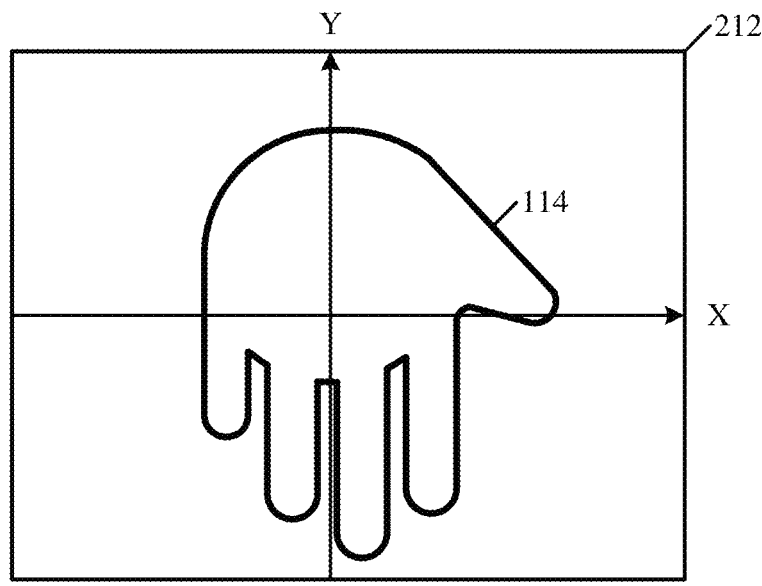
FIGS. 2B and 2C depict a geometric transformation between a reference image and another image in accordance with an implementation of the technology disclosed.
Figure 2B:
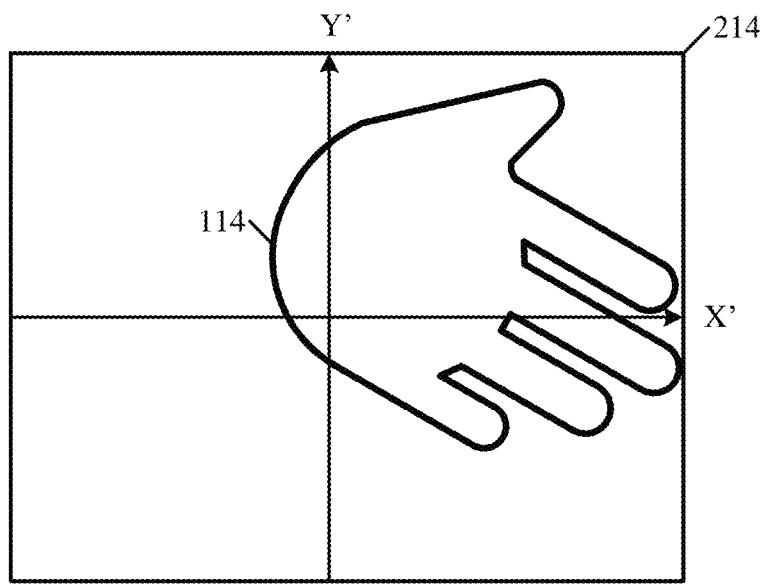
Figure 2C:
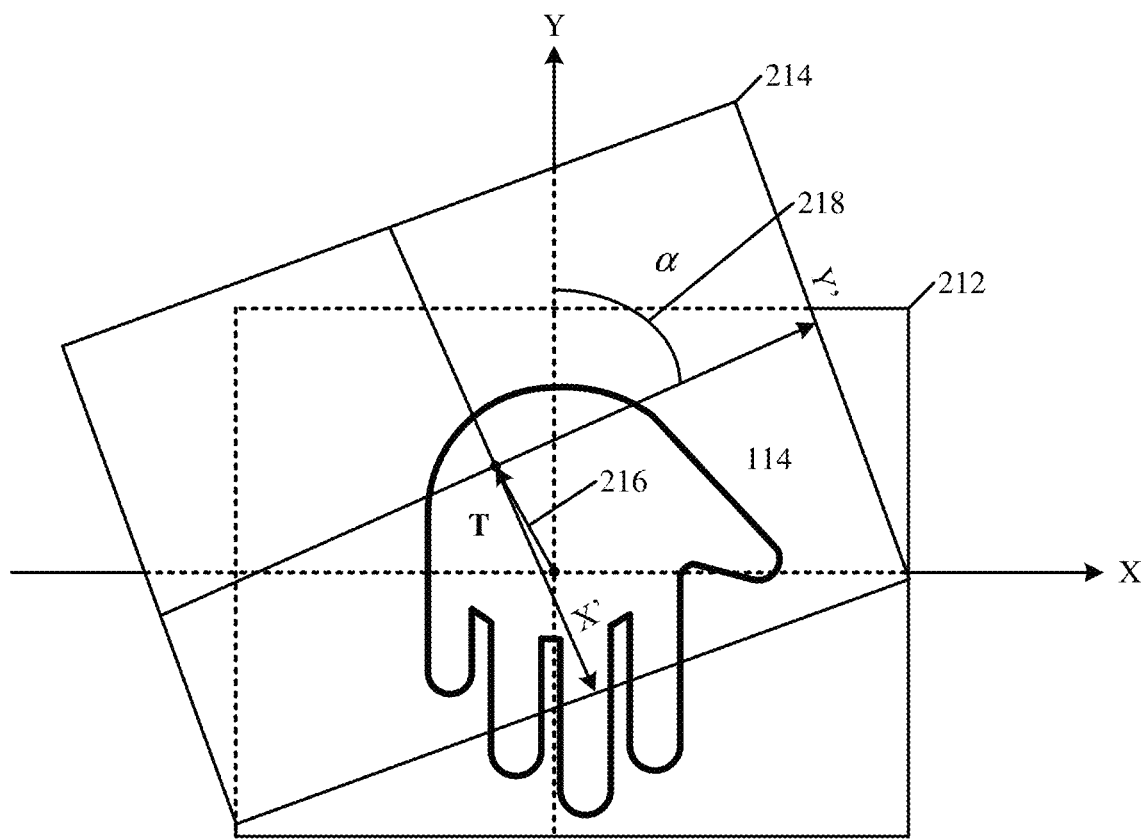

Refer now to FIGS. 2A-2C (with continued reference also to FIGS. 1A and 1B), which illustrate two motion sensors 202, 204, each of which captures an image of object 114 from different perspectives. To construct a model combining images from sensors 202, 204, correspondence between the different images is established based on at least one common image point or feature within the fields of view of both sensors and identifiable in both images. Corresponding image points can be identified by any of various techniques known to those in the art. For example, a Gaussian filter can be applied to the images for edge detection. Other forms of filters, such as linear lowpass, highpass, or bandpass filters can be used to single out features or outlines within the images likely to yield good matches; such filters can also identify other image nonlinearities to assist with matching and reduce noise. Object detection module 152 can operate by first analyzing the detected edges in a coarse fashion to identify similar patterns likely to contain corresponding image points, and thereupon perform a finer analysis to identify precise point-to-point correspondences using, for example, error-minimization techniques. FIG. 2B shows the hand 114 as it appears in an image 212 captured by sensor 202 relative to its local Cartesian axes x and y, and the hand 114 as it appears in an image 214 captured by sensor 204 relative to its local Cartesian axes x' and y'; although common corresponding image points are readily identified, the positions and orientations of the hand 114 are shifted, indicating that the reference coordinate system for each sensor is not in alignment with the other. Bringing the images into alignment requires characterization of the shifts in location of the hand from one image to the other—i.e., the geometric coordinate transformation relating the two sets of Cartesian axes. As the sensors 202, 204 are assumed to be stationary, remaining in the same location when capturing subsequent images, this characterization need only be done once in order to align all subsequent images captured.

Using image 212 as the reference image, the geometric transformation of the hand identified to image 214 is calculated by the transformation analysis module 154. As illustrated in FIG. 2C, points along the outline of the hand 114 in image 214 are mapped to corresponding points in image 212 by matching up like pixels using, for example, a conventional error-minimization calculation or other matching algorithm. During this mapping process, vectors are computed between the two images to relate the image points identified as corresponding. That is, the shift between corresponding points in the two images can be measured as a rigid transformation characterized by a translation T (216) and a rotation α (218). Translation can be measured as the displacement of the original center pixel (as illustrated) or any other point from image 214 to its new mapped location in image 212. A rotation can be measured as the displacement of the y and y' axes. Of course, because the object 114 is in 3D space and the motion sensors 202, 204 are not coplanar with parallel optical axes, the transformation must account for translations and rotations based on perspective changes in the hand 114 as it appears in each image. For additional background information regarding transformation operations (which include affine, bilinear, pseudo-perspective and biquadric transformations), reference can be made to e.g., Mann & Picard, "Video orbits: characterizing the coordinate transformation between two images using the projective group," *MIT Media Laboratory Technical Report No*. 278 (1995) (the entirety of which is hereby incorporated by reference).

Every image captured by sensor 204 can now be shifted and rotated, by the object analysis module 156, in accordance with the transformation parameters to align with the reference coordinate system of sensor 202, and the images captured by sensors 202, 204 can thereby be combined. In this way a composite image including pictorial information available to only one of the sensors can be generated, and a more robust 3D model of the hand 114 can be developed in the same way—i.e., including portions visible to only one of the sensors.

Rigid transformations between images generally assume that the object on which the transformation is based is the same shape and size in both images. Because a hand can well change shape over time, the two basis images underlying the transformation are desirably obtained simultaneously. For example, the camera interfaces 136 of different sensors can send out synchronization signals ensuring that images are captured simultaneously. Such operations can be impossible or inconvenient, however, depending on the implementation, so in some implementations, transformation analysis module 154 is configured to tolerate some elapsed time between capture of the two images 212 and 214—but only calculate the rigid transformation if the elapsed time is not excessive; for example, all images acquired by both sensors can be timestamped with reference to a common clock, and so long as the rigid transformation is robust against slight deviations, it can proceed.

As noted above, while the geometric transformation is illustrated in two dimensions in FIG. 2B, the rigid body model can be parameterized in terms of rotations around and translations along each of the three major coordinate axes. The translation vector T can be specified in terms of three coordinates $T_x$, $T_y$, $T_z$ relative to a set of x, y, z Cartesian axes or by giving its length and two angles to specify its direction in polar spherical coordinates. Additionally, there are many ways of specifying the rotational component α, among them Euler angles, Cayley-Klein parameters, quaternions, axis and angle, and orthogonal matrices. In some rigid body transformations an additional scaling factor can also be calculated and specified by its three coordinates relative to a set of x, y, z Cartesian axes or by its length and two angles in polar spherical coordinates.

Figure 3:
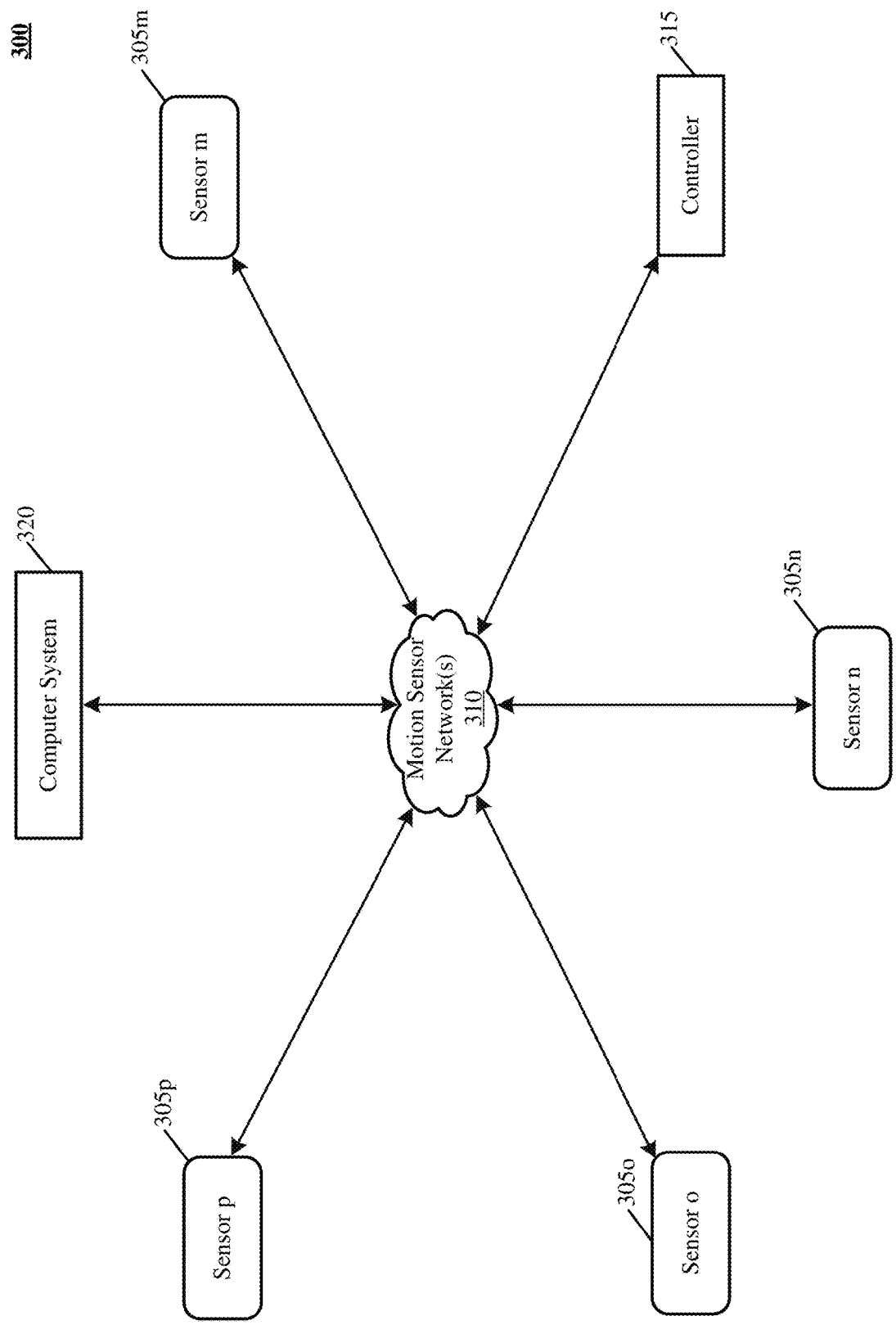
FIG. 3 illustrates the organization of a device network in accordance with one implementation of the technology disclosed.

Refer now to FIG. 3, which illustrates the overall organization of a device network 300 in accordance with one implementation of the technology disclosed. A plurality of motion sensor devices 305*m*, 305*n*, 305*o*, 305*p* intercommunicate wirelessly as nodes of, for example, an ad hoc or mesh network 310. In fact, such a network is really an abstraction that does not exist independently of the devices 305; instead, the network 310 represents a shared communication protocol according to which each of the sensors 305 communicates with the others in an organized fashion that allows each device to send and receive images and other messages to and from any other device. If all devices are within range of each other, they can send images and messages over a fixed frequency using a local area network (e.g., a ring topology) or other suitable network arrangement in which each device "multicasts" images and messages to all other devices in accordance with a communication protocol that allocates network time among the devices. Typically, however, a more advanced routing protocol is used to permit messages to reach all devices even though some are out of radio range of the message-originating device; each device "knows" which devices are within its range and propagates received messages to neighboring devices in accordance with the protocol. Numerous schemes for routing messages across mesh networks are known and can be employed herein; these include AODV, BATMAN, Babel, DNVR, DSDV, DSR, HWMP, TORA and the 802.11s standards.

The devices 305 can be physically distributed around a large space to be monitored and arranged so that, despite obstructions, all areas of interest are within at least one sensor's field of view. For example, as described in U.S. Ser. No. 61/773,246, filed on Mar. 6, 2013 and titled MOTION-CAPTURE APPARATUS WITH LIGHT-SOURCE FORM FACTOR (the entire disclosure of which is hereby incorporated by reference), the sensors 305 can be deployed in light-emitting packages that are received within conventional lighting receptacles.

Each device 305 is equipped to capture a sequence of images. The network can, in some implementations, include a controller 315 equipped to communicate with each sensor 305; as discussed below, the role of controller 315 can be substantial or as minor as synchronizing the sensors to perform image processing and analysis operations—including calculating the transformations as they relate to the coordinate system of, for example, a reference sensor 305*p*. The images acquired by sensors 305 can be aligned based on the transformations and used to construct a 3D model of a tracked object. The 3D model, in turn, can be used to drive the display or analyzed for gestural content to control a computer system 320 connected to the network 310 (i.e., in the sense of being able to communicate with other network nodes). In one implementation, the computer system 320 serves as the controller 315. Alternatively, in some network topologies, the central controller 315 is eliminated by designating one of the sensors as a "master" sensor; although a master device can be specially configured, more typically it is simply a designated one of the sensors, any of which is equipped to act as master if triggered to do so. In such topologies, the sensors 305 can contain on-board image-processing capability, independently analyzing images and, for example, operating in pairs or small groups whereby a sensor combines image features with those of a neighboring sensor. In such implementations, each sensor can store a rigid transformation relating its images to those obtained by only one or two other sensors, since the image data acquired by more distant sensors be progressively less relevant. Such topologies can be useful in security contexts; for example, in a retail or warehouse environment, controller 315 can integrate information from multiple sensors 305 to automatically track the movements of individuals from the monitored space of one device 305 to the next, determining whether they are exhibiting behavior or following routes consistent with suspicious activity.

In the present discussion, sensor 305*p* has been designated as the reference sensor to which images from all other sensors (or at least neighboring sensors) are aligned. The reference sensor can be chosen by sensors 305 themselves using a common voting or arbitration algorithm. For example, each sensor can analyze its current image and transmit to the other sensors a parameter indicating the size, in pixels, of an identified object. The reference sensor can be selected as the one having the largest object image size on the assumption that it is closest thereto; alternatively, the reference sensor can simply be the sensor with lowest or highest serial number or MAC address among the intercommunicating sensors 305. Any form of designation through image analysis, sensor identity, or other selection method can be employed to choose the reference sensor. The designation can be made by controller 315, computer system 320, a master node 305, or by communication of all sensors 305 in the network. Similarly, the master node can be chosen in much the same in network topologies utilizing a master and slave setup.

In operation, a user arranges sensors 305m, 305n, 305o, and 305p such that each sensor's field of view includes at least a portion of a common area of interest—i.e., the sensors constituting a network (or an operative group within the network) typically have at least some field-of-view overlap. Once the sensors have been placed, they are activated and begin to capture images. In various implementations, a signal can be sent out to synchronize when the first image is captured by each of the sensors 305. This signal can be initiated by controller 315, computer system 320, or by one of the sensors 305. In one implementation, sensors 305m, 305n, 305o, and 305p transmit images to the central controller 315 that, for example, designates the first image of sensor 305p as a reference image. Using techniques for calculating the rigid transformations as described above, controller 315 compares the first image captured by sensor 305m with the first image captured by reference sensor 305p, and parameters specifying the calculated transformation (e.g., with device 305p at the origin of the geometric coordinate system) are computed and saved in the memory of controller 315 in a table 405 as shown in FIG. 4A. The process is repeated to calculate the rigid transformation relating sensors 305n and 305p by analyzing the first image captured by sensor 305n with the first image captured by sensor 305p. The process continues so that every sensor is related geometrically to the reference sensor 305p. Alternatively, in the absence of a controller, one sensor can be designated, through communication between sensors, as the master node to assume the role as described for the controller 315. Table 405 can be saved in only this master node or it can be simultaneously saved in all sensors, giving any one of them the ability to take over the master role at any time, and to arbitrarily combine image data with images from other sensors. Either way, sensors 305m, 305n, 305o, and 305p continue to acquire images and transmit them to the controller 315, or to the master sensor, in their local coordinate systems as they are captured. The controller 315 or master node transforms the images in accordance with the alignment parameters so they are all aligned to a common coordinate system for compilation or for 3D rendering.

In one implementation, the sensors are configured to autonomously self-calibrate to a common coordinate system corresponding to the viewpoint of one of the motion sensors, eliminating the need for a controller or master node. In such an arrangement, any motion sensor device node can communicate with any other device, either directly or through intermediate nodes. Through communication the sensors can choose the first image of sensor 305p as the reference image to be used in calculating the transformations of the first images captured by the other sensors; an image from each motion sensor is successively compared to the reference image to determine the associated geometric transformation. Alternatively, an image from one sensor can be compared to an image captured by a neighboring sensor in a round robin fashion so that each sensor "knows" how to combine its images with those of its nearest neighbor or neighbors. Thus, sensor 305p can communicate its first captured image to sensor 305m, which calculates the transformation of its first image with respect to the image received from sensor 305p and saves the transformation parameters to a table. Sensor 305m transmits its first captured image to sensor 305n, which it turn calculates transformation parameters of its first image with respect to the image received from sensor 305m. And so on. Each sensor can store a table as shown in FIG. 4B.

The network 310 can be organized to accommodate new motion sensors added as nodes at any time, with appropriate rigid transformations computed as a consequence of entry of the sensor onto the network. The new sensor is recognized by every other sensor and by a central controller (if the system includes one), and the network is effectively expanded merely as a result of this recognition; the new device can communicate with every other device, and the central controller can interrogate it or respond to images that it sends to determine its location in relation to the other sensors and align the images accordingly. Similarly, loss of a device—due either to malfunction or deliberate removal from the network—does not affect overall network operation.

Computer programs incorporating various features of the technology disclosed can be encoded on various computer readable storage media; suitable media include magnetic disk or tape, optical storage media such as compact disk (CD) or DVD (digital versatile disk), flash memory, and any other non-transitory medium capable of holding data in a computer-readable form. Computer-readable storage media encoded with the program code can be packaged with a compatible device or provided separately from other devices. In addition program code can be encoded and transmitted via wired optical, and/or wireless networks conforming to a variety of protocols, including the Internet, thereby allowing distribution, e.g., via Internet download.

The technology disclosed can be used in connection with numerous applications including, without limitation, consumer applications such as interfaces for computer systems, laptops, tablets, telephone devices and/or as interfaces to other devices; gaming and other entertainment applications; medical applications including controlling devices for performing robotic surgery, medical imaging systems and applications such as CT, ultrasound, x-ray, MRI or the like; laboratory test and diagnostics systems and/or nuclear medicine devices and systems; prosthetics applications including interfaces to devices providing assistance to persons under handicap, disability, recovering from surgery, and/or other infirmity; defense applications including interfaces to aircraft operational controls, navigation systems control, on-board entertainment systems control and/or environmental systems control; automotive applications including interfaces to and/or control of automobile operational systems, navigation systems, on-board entertainment systems and/or environmental systems; manufacturing and/or process applications including interfaces to assembly robots, automated test apparatus, work conveyance devices such as conveyors, and/or other factory floor systems and devices; genetic sequencing machines, semiconductor fabrication related machinery, chemical process machinery and/or the like; security applications (e.g., monitoring secure areas for suspicious activity or unauthorized personnel); and/or combinations thereof.

Figure 5:
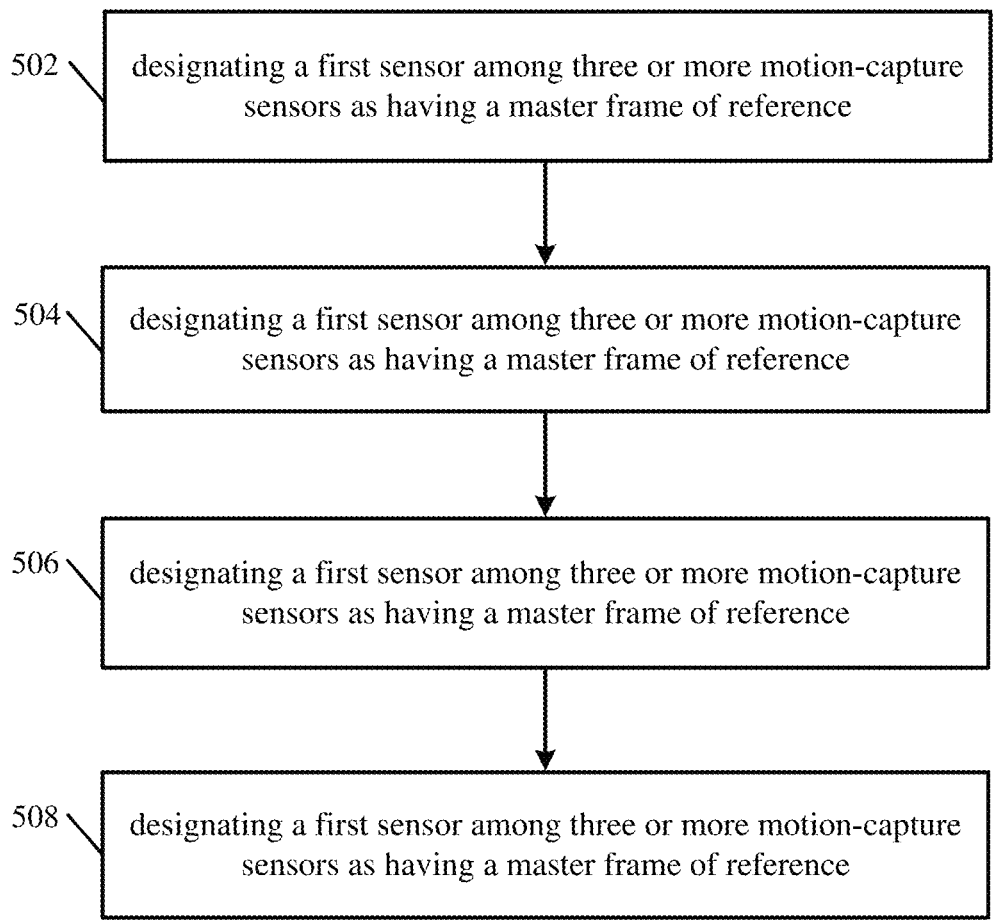
FIG. 5 illustrates one implementation of a method of coordinating motion-capture of at least one hand by a network of motion-capture sensors having overlapping fields of view.

FIG. 5 illustrates one implementation of a method of coordinating motion-capture of at least one hand by a network of motion-capture sensors having overlapping fields of view. Flowchart 500 can be implemented at least partially with and/or by one or more processors configured to receive or retrieve information, process the information, store results, and transmit the results. Other implementations can perform the actions in different orders and/or with different, fewer or additional actions than those illustrated in FIG. 5. Multiple actions can be combined in some implementations. For convenience, this flowchart is described with reference to the system that carries out a method. The system is not necessarily part of the method.

At action 502, a first sensor among three or more motion-capture sensors is designated as having a master frame of reference. The method also includes calibration to the master frame of reference by calculation of rigid geometric coordinate transformations between pairs of the motion-capture devices. In one implementation, the geometric coordinate transformations are calculated among adjoining pairs of the motion-capture devices that share the overlapping fields of view. In another implementation, the geometric coordinate transformations are an affine transformation.

At action 504, motion of a hand is observed as it passes through overlapping fields of view of the respective motion-capture sensors.

At action 506, capture of images is synchronized of the hand within the overlapping fields of view by at least pairs of the motion-capture devices. Some implementations include time stamping the hand images captured relative to a common clock and using for calibration only pairs of the hand images that are time stamped within a predetermined tolerance of elapsed time difference.

At action 508, the pairs of the hand images captured by the synchronized motion-capture devices is used to automatically calibrate the motion-capture sensors to the master frame of reference frame

PARTICULAR IMPLEMENTATIONS

In one implementation, a system is described that identifies a position and shape of an object in three-dimensional (3D) space. The system includes a housing including a base portion and a body portion, the base portion including electrical contacts for mating with a lighting receptacle, within the housing, at least one camera oriented toward a field of view through a port in the housing, and an image analyzer coupled to the camera for receipt of image data from the camera, the image analyzer configured to capture at least one image of the object and to generate object data indicative of a position and shape of the object in 3D space, and power conditioning circuitry for converting power supplied to the lighting receptacle to power suitable for operating the at least one camera and the image analyzer.

This system and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations.

The system of further includes a transmitter circuit for transmitting the object data to an external computer system for computationally reconstructing the object. It also includes a lighting unit within the housing for providing ambient light to the 3D space. The lighting unit comprises at least one light-emitting diode and a phosphor. The image analyzer is further configured to slice the object into a plurality of two-dimensional (2D) image slices, each slice corresponding to a cross-section of the object, identify a shape and position of the object based at least in part on an image captured by the image analyzer and a location of the housing, and reconstruct the position and shape of the object in 3D space based at least in part on a plurality of the 2D image slices.

In one implementation, the base comprises threads and a contact mateable with an Edison screw socket. In another implementation, the base comprises prongs mateable with a halogen lamp socket. In some implementations, the base comprises two opposed bases separated by the body portion and configured to be received within a fluorescent tube receptacle. The at least one camera comprises a plurality of cameras each having an optical axis extending radially from the housing and displaced from the other optical axes. Each said camera has a field of view, at least two of the fields of view overlapping one another to create an overlapped region, whereby when the object is within the overlapped region, image data from said cameras creating the overlapped region can be used to generate object data in 3D. The optical axes are angularly displaced from one another.

Other implementations may include a non-transitory computer readable storage medium storing instructions executable by a processor to perform any of the methods described above. Yet another implementation may include a method including memory and one or more processors operable to execute instructions, stored in the memory, to perform any of the actions described above.

The terms and expressions employed herein are used as terms and expressions of description and not of limitation, and there is no intention, in the use of such terms and expressions, of excluding any equivalents of the features shown and described or portions thereof. In addition, having described certain implementations of the technology disclosed, it will be apparent to those of ordinary skill in the art that other implementations incorporating the concepts disclosed herein can be used without departing from the spirit and scope of the technology disclosed. Accordingly, the described implementations are to be considered in all respects as only illustrative and not restrictive.

What is claimed is:

1. A method of coordinating three-dimensional (3D) motion-capture, the method comprising:

designating a first 3D motion-capture sensor among two or more 3D motion-capture sensors as having a master frame of reference, each respective 3D motion-capture sensor of the two or more 3D motion-capture sensors: (i) having networked connectivity to other 3D motion-capture sensors of the two or more 3D motion-capture sensors; and (ii) monitoring a portion of a monitored space falling within a field of view of the respective 3D motion-capture sensor;

observing, by the first 3D motion-capture sensor and at least one other 3D motion-capture sensor of the two or more 3D motion-capture sensors, 3D motion of a hand in the monitored space as the hand passes through at least two overlapping fields of view of the first 3D motion-capture sensor and the at least one other 3D motion-capture sensor;

utilizing the networked connectivity between the first 3D motion-capture sensor and the at least one other 3D motion-capture sensor to synchronize a capture of at least one pair of images of the hand within the at least two overlapping fields of view;

calibrating the at least one other 3D motion-capture sensor to the master frame of reference of the first 3D motion-capture sensor independently of a pre-determined landmark location of a surrounding environment; and in response to a loss of connectivity with the first 3D motion-capture sensor, designating a second 3D motion-capture sensor as a new master sensor having the master frame of reference.

2. The method of claim 1, further including calibrating a third 3D motion-capture sensor to the master frame of reference of the second 3D motion-capture sensor independently of a pre-determined landmark location of the surrounding environment.

3. The method of claim 1, further including recognizing a gesture of the hand based on a motion of a generated 3D model of the hand generated by capturing the pair of images from calibrated 3D motion-capture sensors.

4. The method of claim 1, wherein the calibrating is performed using one or more rigid geometric coordinate transformations between the new master sensor and the at least one other 3D motion-capture sensor calculated based on a determined shift between corresponding points on the hand in the captured at least one pair of images.

5. The method of claim 4, wherein the one or more rigid geometric coordinate transformations include at least one affine transformation.

6. The method of claim 4, wherein the calculating of the one or more rigid geometric coordinate transformations includes generating translation or rotation parameters that describe geometric shifts relating any two images of the hand captured by the new master sensor and the at least one other 3D motion-capture sensor.

7. The method of claim 1, wherein one of the two or more 3D motion-capture sensors is configured to be installed into a head mounted display.

8. The method of claim 1, further comprising the at least one other 3D motion-capture sensor supplying an image to the new master sensor for the calibrating of the at least one other 3D motion-capture sensor.

9. The method of claim 1, further comprising analyzing an image from the new master sensor and the image supplied from the at least one other 3D motion-capture sensor through a sensor interface to perform the calibrating of the at least one other 3D motion-capture sensor.

10. A non-transitory computer readable storage medium impressed with computer program instructions to coordinate three-dimensional (3D) motion-capture, the instructions, when executed on a processor, implement a method comprising:
designating a first 3D motion-capture sensor among two or more 3D motion-capture sensors as being a master sensor having a master frame of reference, each respective 3D motion-capture sensor of the two or more 3D motion-capture sensors: (i) having networked connectivity to other 3D motion-capture sensors of the two or more 3D motion-capture sensors; and (ii) monitoring a portion of a monitored space falling within a field of view of the respective 3D motion-capture sensor;
observing, by the first 3D motion-capture sensor and at least one other 3D motion-capture sensor of the two or more 3D motion-capture sensors, 3D motion of a hand in the monitored space as the hand passes through at least two overlapping fields of view of the first 3D motion-capture sensor and the at least one other 3D motion-capture sensor;
utilizing connectivity between the first 3D motion-capture sensor and the at least one other 3D motion-capture sensor to synchronize a capture of at least one pair of images of the hand within the at least two overlapping fields of view;
calibrating the at least one other 3D motion-capture sensor to the master frame of reference of the first 3D motion-capture sensor independently of a pre-determined landmark location of a surrounding environment; and
in response to a loss of connectivity with the first 3D motion-capture sensor, designating a second 3D motion-capture sensor as a new master sensor having the master frame of reference.

11. The non-transitory computer readable storage medium of claim 10, wherein the method further includes calibrating a third 3D motion-capture sensor to the master frame of reference of the second 3D motion-capture sensor independently of a pre-determined landmark location of the surrounding environment.

12. The non-transitory computer readable storage medium of claim 10, wherein the calibrating is performed using one or more rigid geometric coordinate transformations between the master sensor and the at least one other 3D motion-capture sensor calculated based on a determined shift between corresponding points on the hand in the captured at least one pair of images.

13. The non-transitory computer readable storage medium of claim 12, wherein the one or more rigid geometric coordinate transformations are calculated by generating translation or rotation parameters that describe geometric shifts relating any two images of the hand captured by the first and second 3D motion-capture sensors.

14. The non-transitory computer readable storage medium of claim 12, wherein the one or more rigid geometric coordinate transformations include at least one affine transformation.

15. The non-transitory computer readable storage medium of claim 10, wherein one of the two or more 3D motion-capture sensors is configured to be installed into a head mounted display.

16. The non-transitory computer readable storage medium of claim 10, wherein the method further includes the at least one other 3D motion-capture sensor supplying an image to the master sensor for the calibrating of the at least one other 3D motion-capture sensor.

17. The non-transitory computer readable storage medium of claim 16, wherein the method further includes analyzing an image from the master sensor and the image supplied from the at least one other 3D motion-capture sensor through a sensor interface to perform the calibrating of the at least one other 3D motion-capture sensor.

18. A motion capture sensory system for coordinating three-dimensional (3D) motion-capture, the motion capture sensory system including:
two or more 3D motion-capture sensors, each respective 3D motion-capture sensor monitoring a portion of a monitored space falling within a field of view of the respective 3D motion-capture sensor, wherein each respective 3D motion-capture sensor (i) has networked connectivity to other 3D motion-capture sensors of the two or more 3D motion-capture sensors; and (ii) monitors a portion of a monitored space falling within a field of view of the respective 3D motion-capture sensor,
wherein the two or more 3D motion-capture sensors are configured to perform:
designating a first 3D motion-capture sensor among two 3D motion-capture sensors as being a master sensor having a master frame of reference, the master frame of reference being for at least one geometric coordinate of a hand;
observing, by the first 3D motion-capture sensor and at least one other 3D motion-capture sensor of the two or more 3D motion-capture sensors, 3D motion of the hand in the monitored space as the hand passes through at least two overlapping fields of view of the first 3D motion-capture sensor and the at least one other 3D motion-capture sensor;

utilizing connectivity between the first 3D motion-capture sensor and the at least one other 3D motion-capture sensor to synchronize a capture of at least one pair of images of the hand within the at least two overlapping fields of view;

calibrating the first 3D motion-capture sensor to the master frame of reference of the first 3D motion-capture sensor independently of a pre-determined landmark location of a surrounding environment; and in response to a loss of connectivity with the first 3D motion-capture sensor, designating a second 3D-motion capture sensor as a new master sensor having the master frame of reference.

* * * * *